United States Patent

[11] 3,594,626

| [72] | Inventor | Charles G. Palmer<br>945 W. Collins Ave., Orange, Calif. 92667 |
|---|---|---|
| [21] | Appl. No. | 817,877 |
| [22] | Filed | Apr. 21, 1969 |
| [45] | Patented | July 20, 1971 |

[54] TEMPLATE FOLLOWER MULTIAXES SERVOSYSTEM
4 Claims, 8 Drawing Figs.

[52] U.S. Cl. .................................................. 318/578,
318/657, 318/685, 318/630
[51] Int. Cl. ....................................................G05b 19/36
[50] Field of Search............................................318/20.102,
20.110, 20.150, 20.160, 20.520, 20.715, 20.745,
20.860

[56] References Cited
UNITED STATES PATENTS

| 2,559,575 | 7/1951 | Fryklund et al.............318/(20.160 X) |
| 2,870,386 | 1/1959 | Kelling........................ 318/(20.520) |
| 2,948,840 | 8/1960 | Haldemann et al.......... 318/(20.150) |
| 2,996,348 | 8/1961 | Rosenberg....................318/(20.102 X) |
| 3,457,484 | 7/1969 | Shimizu et al. ............... 318/(20.160) |

Primary Examiner—T. E. Lynch
Attorney—Nienow & Frater

ABSTRACT: This invention relates to improvements in servosystems, particularly position servosystems. The specification discloses, and the drawing depicts, a two axis positioning system having an analog input structure and a digital positioner. Novel electric circuitry is disclosed by which the analog input information is conditioned for application to the digital positioner. Two forms of manually operable input structures are shown.

PATENTED JUL 20 1971
3,594,626
SHEET 1 OF 2
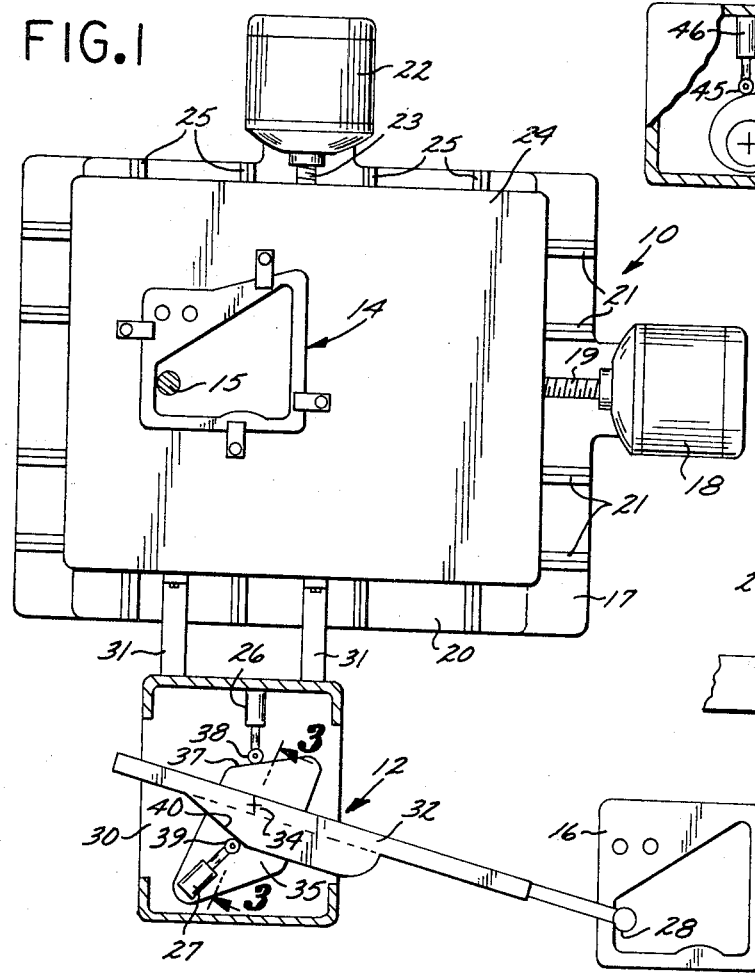
FIG.1
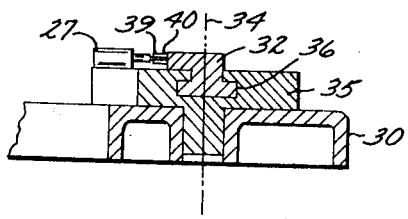
FIG.2
FIG.3
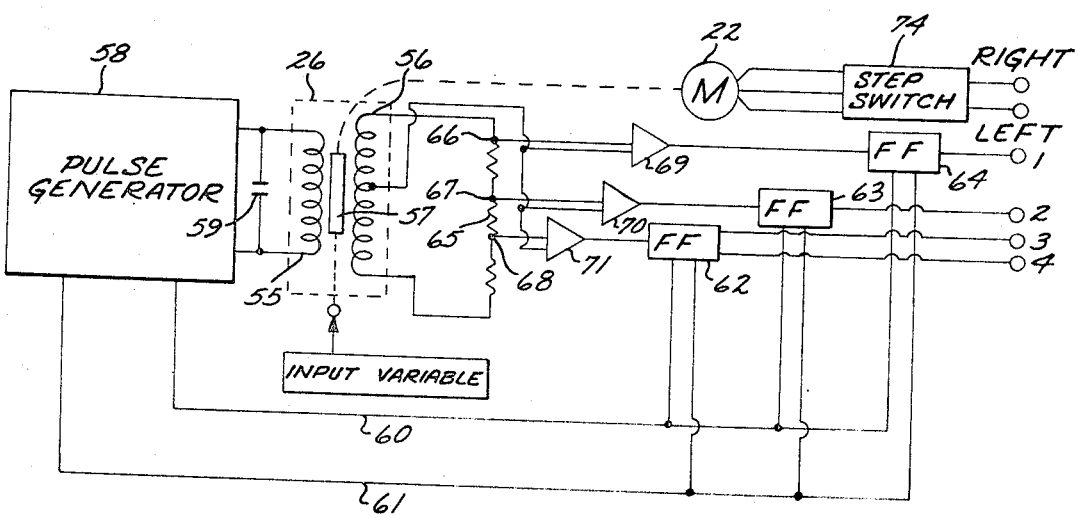
FIG.4
INVENTOR.
CHARLES G. PALMER
BY
Nienow & Frater
ATTORNEYS

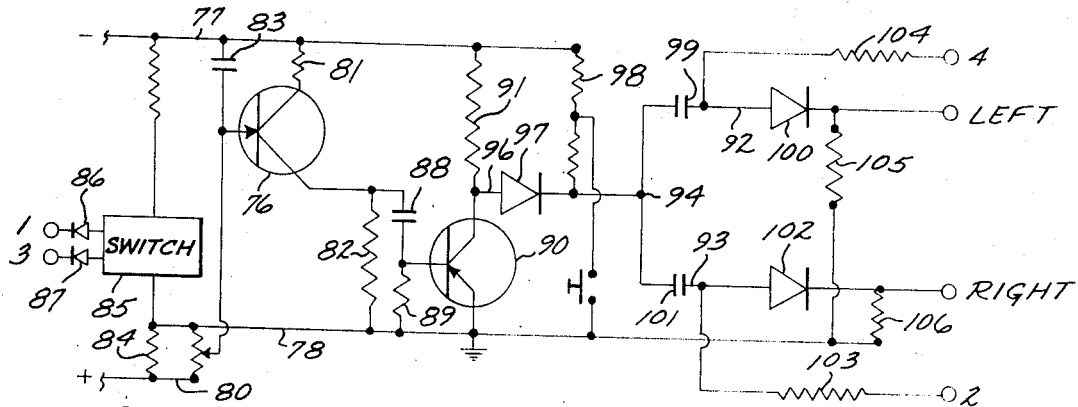
FIG.5
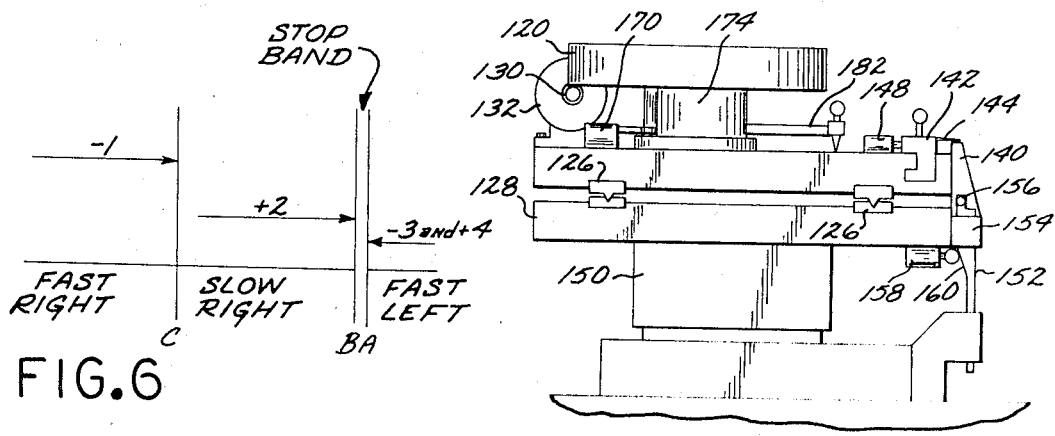
FIG.6
FIG.8
FIG.7
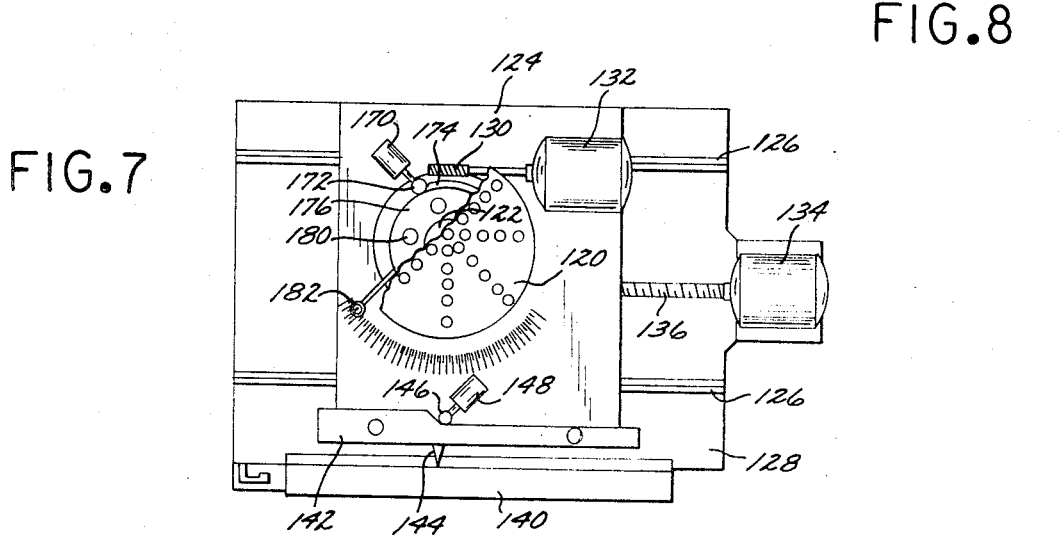
INVENTOR.
CHARLES G. PALMER
BY
Nienow & Frater
ATTORNEYS 3,594,626

TEMPLATE FOLLOWER MULTIAXES SERVOSYSTEM

This invention relates to improvements in servosystems and it relates particularly to improvements in servo positioners.

An object of the invention is to provide an improved servosystem. More particularly, it is an object to provide a servosystem capable of accurate control with a high order of reliability and at low cost.

While the invention is not limited thereto, it is particularly well suited to applications in which the reference signal is continuously variable but in which it is desired that the correction be accomplished digitally. Provision of such a servosystem in improved form is another object of the invention. Digital correction can be made as accurate as the correction increments are made small and the degree of accuracy can be predicted and uniform even when the load is large and variable. For example, when incorporated in a machine tool control, relative movement between the tool and workpiece can be controlled digitally for high accuracy even though the input to the servo consists only of manual manipulation of a stylus or probe over a template or other pattern. There are other examples including some such as the making of inspection measurements, where positioning is not the end purpose to be served. Nonetheless, the invention is so well suited to machine control that an embodiment of the invention devoted to this purpose has been selected for illustration in the accompanying drawings. The invention permits conduct of machine operations with the accuracy achieved in computer controlled machines without the need for the special programs and special input forms employed in the control computers of such machines.

In preferred form the output of the servosystem incorporating the invention provides for relative positioning of the structure to be positioned, here the machine tool and workpiece, in two dimensions which may be lineal or rotational. The output is a positioner which moves either the workpiece or the tool. Input to the preferred embodiment is position of one or more styluses or probes with respect to a reference position and, since the stylus may be continuously moved, the servo is arranged to accept continuously variable input information. The servo also includes a means to convert that analog information to the digital information used for position control.

Certain of these and other advantages of the invention are realized because of inventive features incorporated in the input structure. Also, certain of the advantages of the invention are realized by the novel features of those elements of the system that accept input information and convert it to output position. For example, certain of the objects and advantages of the invention result from the provision in a servo positioner of a moveable base structure including an output base member moveable in at least two dimensions; of probe means carried by the base structure and moveable relative thereto in at least two dimensions from a reference position relative to the base structure to one indicative of the position the base member is to occupy; of sensing means for sensing differences, in said two dimensions, in the relative position of the probe or probes and the base member from the reference relative position; and of positioning means responsive to said sensing means for positioning said base structure such that it occupies such reference relative position. Also, certain objects and advantages of the invention are realized by the provision of an error detection means sensitive to the state of a condition relative to a reference state by which to provide a first signal indicative of whether the state of the condition exceeds or whether it does not exceed the reference state, and by the provision of a second signal indicative of whether or not the state of the condition differs from the reference state by more than a selected amount, and for providing a third signal indicative of whether or not the state of the condition differs from the reference state by more than a selected greater amount; and also by the provision of correction means responsive to said signals for altering the state of the condition in a direction toward the reference condition at a rate greater in response to certain of said signals than in response to others of them.

In the drawings:

FIG. 1 is a top plan view of a servosystem embodying the invention together with a workpiece undergoing processing to conform to a template by a machine tool shown in cross section;

FIG. 2 is a top plan view, showing a fragment of its cover, of an input structure alternative to the input structure illustrated in FIG. 1;

FIG. 3 is a cross-sectional view taken on line 3-3 of FIG. 1 showing the sliding bar and pivot arrangement employed in the input structure of FIG. 1;

FIG. 4 is an electrical diagram, partly schematic and partly in block form, of portions of a servosystem embodying the invention;

FIG. 5 is an electrical diagram, in schematic and block form, of a portion of a servosystem which together with the portions illustrated in FIG. 4 comprise a complete system;

FIG. 6 is a diagram illustrating operation of the servosystem shown in FIGS. 4 and 5;

FIG. 7 is a top plan view, fragmented in part, of a servosystem of alternative form which embodies the invention; and FIG. 8 is an end view of the system illustrated in FIG. 7.

Referring to FIG. 1 of the drawing, the apparatus there shown comprises an output structure generally designated 10 and an input structure generally designated 12. A workpiece 14 carried by the output member is to be processed by a machine tool element 15 in accordance with the movements over a template 16 of a probe which forms a part of the input structure 12. The output member 10 comprises a lower base or bed 17 on which is mounted a drive motor 18 rotatable to turn a drive screw 19. The drive screw 19 is connected by a travelling nut mechanism, not shown, to a lower table 20 which is driven over the surface of the bed 17 when the screw 19 is turned. The lower table 20 is confined to reciprocal motion in one direction relative to the bed 17 by a number of ways 21. The drive motor 22 is fixed to the lower table 20 and moves with it. The motor 22 rotates a drive screw 23. The latter is connected by travelling nut mechanism, not shown, to the work table 24. The upper table is confined to reciprocal movement in a direction perpendicular to motion of the lower table relative to the bed of ways 25 formed in the upper surface of the lower table. Accordingly, by combinations of rotation of motors 18 and 22, the lower and upper tables may be driven so that the workpiece 14, which is fixed to the upper surface of the upper table 24, may be moved in the X and Y directions or any combination of them. The motors 18 and 22 are stepping motors arranged to turn through a very small angle in response to an input excitation signal. Rotational movement of the motor is converted to lineal movement of the X Y table by the lead screw 19 in the case of motor 18 and by the lead screw 23 in the case of motor 22. These lead screws are provided with threads which advance only in small degree per revolution whereby the incremental movement of the table structure upon the occasion of a pulse being applied to one of the stepping motors, is very small indeed.

Signals for actuation of the motors 18 and 22 are derived from transducers carried by the input structure 12. Two transducers are employed and each of them provides a signal, which after conditioning, is applied to one of the positioning motors. This signal conditioning apparatus is not visible in FIG. 1. Nonetheless, transducer 26 transforms mechanical displacement information into an electrical signal which ultimately is used to control operation of the upper table positioning motor 22. The other transducer 27 converts mechanical displacement information into an electrical signal which is ultimately applied to the table positioning motor 18. To facilitate description, the orientation of the positioning apparatus 10 in FIG. 1 is considered to be the reference orientation. Operation of motor 22 has the effect of moving the workpiece 14 in the Y direction whereas actuation of the motor 18 has the effect of moving the workpiece 14 in the X direction. Thus, transducer 26 controls Y direction movement and transducer 27 controls X direction movement.

It is not essential that the signal generated in transducer 26 be proportional only to the Y displacement of the stylus or probe 28 as it is moved over the template 16. Similarly, the transducer 27 need not generate a signal whose characteristics are confined to the X component of motion the probe 28. These two transducers are carried upon a baseplate 30 which has fixed connection by the connection bars 31 to the upper table 24 of the positioning mechanism. The effect of the servo loop is to reposition the base 30 following displacement of the probe so that the arm 32 upon which the probe 28 is carried is returned to original reference position. It matters not that motion of the probe 28 is not divided into X and Y components by the transducers because whatever the error in the position of arm 32 the table drive motors 18 and 22 will be actuated until the arm 32 is returned to original orientation relative to the transducers.

In this input structure the transducers 26 and 27 measure rotation of the probe arm 32 about a pivot axis 34 best shown in FIG. 3 and marked by the intersection of a pair of construction lines in FIG. 1. They also measure distance from that pivot axis to the probe 28. The element labeled 35 is a cam structure which is free to rotate with respect to the base 30 about the axis 34. The probe arm 32 slides within a T-slot 36 formed in the cam 35 so that it extends through the axis 34. Arm 32 is slideable in that slot such that the distance from the probe 28 to the axis may be varied easily and so that no rotation of the probe 28 is possible without rotation of the cam member 35. The cam member 35 has a cam face 37 at one side which cooperates with the cam roller 38. Roller 38 serves as a follower and is connected by a link to the transducer body 26 where translation of the link is converted into electrical signals. The transducer 27 has a similar roller 39 which is connected by a link to mechanism within the body of the transducer where its motion is translated into electrical signals. The roller 39 acts as a cam follower in conjunction with the cam surface 40 formed at the upper side edge on one side of the arm 32. The cam surface 40 has a shape to actuate the follower 39 as the probe bar 32 is slided relatively to the cam member 35.

An alternative form input structure is illustrated in FIG. 2. This embodiment comprises a base 41 which is somewhat similar to the base 30 in FIG. 1. A pin 42 extends upwardly from the base 41 and perpendicular to it. This pin serves as the axis for rotation of a first arm 43 which terminates in a cam surface 44. The cam surface 44 is spiralled outwardly from the center axis of the pin 42. The cam surface 44 cooperates with a cam follower roller 45 to actuate the mechanical-to-electrical signal transducer 46 carried by the base 41. A pin 47 projects perpendicularly from the arm 43 at its outer end and this pin forms the axis about which a second lever 48 is rotatable. At its inner end the lever 48 has a side edge which serves as a cam cooperating with a cam roller follower 50. The latter moves to actuate the mechanical-to-electrical signal transducer 51 which is carried by the arm 43. The cam surface 49 is formed as a spiral around the axis of rotation of the arm 48. At the other end the arm 48 carries the stylus or probe 52 which corresponds to the probe 28 in FIG. 1. This input structure form is advantageous for certain applications whereas the input structure depicted in FIG. 1 is advantageously employed in other applications of the invention.

The two drive motors 18 and 22 are stepping motors and advantageously are of a kind that rotate through a very small angle in response to an input pulse. Provision is made for driving the motor in opposite directions selectively. A variety of stepping motors, and of switching apparatus, accessory to such motors for providing proper actuation signals in response to input pulses, are readily available. Thus in the preferred form of output device, the output drive members are adapted to receive pulse information, to drive the tables in a direction corresponding to pulse polarity and to drive the tables through incremental steps at a rate determined by pulse rate. On the other hand, the probe by which the input information is applied to the servosystem is continuously variable in position so that some means must be provided in this preferred embodiment for converting probe movements into pulse signals. This is done by generating pulses in response to movement of the transducers from reference position, the pulse having one phase when moved in one direction from reference position and having the opposite phase when moved in the opposite direction from reference position. The frequency of the pulses is made independent of the degree of displacement of the probe arm from reference position except to the extent that it is desired to drive the table at different speeds corresponding to different degrees of displacement of the arm. In the embodiment of the invention selected for illustration, the table is driven rapidly back to reference position when the arm has been displaced on one side of reference position and it is also returned rapidly when the arm has been displaced on the opposite or other side of reference position by more than a selected amount. When displacement on that opposite or other side of reference position is less than said selected degree, then the table is driven at slower speed. The effect of this arrangement is that the arm is always driven to reference position by movement in the same direction whereby to overcome the effect of any backlash in the system. This is accomplished by driving the tables sufficiently rapidly back to reference position when the displacement is in said one direction so that it will overshoot and take a position on the opposite side. Having overshot sufficiently, the position error signals will reverse and the arm will be returned to reference position at slow speed.

One signal conditioner is employed between transducer 26 in FIG. 1 and the drive motor 22. Another signal conditioner is employed between the transducer 27 and the drive motor 18. The two signal conditioners may be, and advantageously are, alike in their construction and a preferred form is incorporated in the diagram of the complete servosystem illustrated in FIGS. 4 and 5. These two figures illustrate the Y-axis servosystem which includes the transducer 26 and the drive motor 22. The transducer may have a variety of forms. It may be a variable impedance device in which impedance is made variable in response to an input mechanical motion. It may be a variable voltage or a variable current device and may be a switching device. The transducer 26 comprises a linear voltage differential transformer having a primary winding 55, a center tapped secondary winding 56 and a core 57 whose position may be varied to unbalance the voltages induced in the respective halves of the center tap winding 56. The core is movable relative to the transformer windings so that it is possible to alter the voltages generated in the two halves of the secondary winding either by moving the core 57 while maintaining the position of the windings, or by moving the windings while maintaining constant the position of the core. On the other hand, it is possible to apply input motion both to the core and to the windings and that has been done in this embodiment. The drive motor 22 drives the two coils 55 and 56 whereas movement of the input arm 32 moves the core 57. The primary winding 55 of the transducer is excited by the voltage output from a pulse generator 58. The actual voltage variation across the primary winding is made generally sinusoidal by the inclusion of a capacitor 59 in parallel with it. In addition, a gate pulse and a reset pulse are taken from the pulse generator by lines 60 and 61, respectively. These pulses are applied to flip-flops 62, 63 and 64 which synchronize the operation of the flip-flops with actuating signals derived from the secondary winding 56 of the transducer. The secondary winding 56 is connected across a series network of resistors 65. The resistor network is tapped at three points designated 66, 67 and 68, respectively. The circuit includes three amplifiers 69, 70 and 71. Each of the amplifiers has its input circuit connected from a respectively associated one of the taps on the resistor network 65 to the center point of the secondary winding 56. Thus each of the amplifiers 69, 70 and 71 is connected in a bridge circuit so that its input is excited in proportion to bridge unbalance. In this embodiment the three bridges are combined into a single network but since each amplifier has its input connected to a separate tap of the resistor network, each bridge will null at a different ratio of voltages in the two halves of the secondary winding 56. Since the ratio of voltages in the two halves of the secondary winding is determined by the position of the core 57, each bridge may be nulled by movement of the core and each will be nulled at a different core position. Since the input voltage to winding 55 alternates, so will the output voltage at cross winding 56 alternate. The voltage applied to the input circuit of each of the amplifiers represents the difference between the voltages generated on the two sides of the bridge and it follows that the phase of the voltage applied to the input circuit of each amplifier is reversed as the core 57 is moved through null for that amplifier. The output of amplifiers 69, 70 and 71 are applied to trigger operation of flip-flops 64, 63 and 62, respectively. The flip-flops will be actuated by the signal only if the set gate is set by a proper pulse on line 60. Because of this synchronism, the flip-flops are able to distinguish and respond to the phase of the output signals from amplifiers 69, 70 and 71. Each flip-flop is reset in the next half cycle by the signal applied at line 61 so that the flip-flop outputs comprise pulses of a polarity determined by the phase of the actuating signal.

At this point attention is invited to FIG. 6 which is a diagram indicating the action resulting in the several parts of the servosystem depending upon the position of the core 57. For the purposes of this diagram it is assumed that the core 57 is moved right and left by positioning movement of the probe arm 32 and that the drive motor, which is made to respond to signals from the transducer, drives its table left and right. The vertical lines in FIG. 6 represent core positions A, B and C. Core position B is the reference position. When the core 27 has position B the workpiece 14 has been moved relative to the tool 15 to a position corresponding exactly to the position of the template 16 relative to the probe 28. The positioner stops when the core 57 occupies this reference position. Position B in FIG. 6 differs only slightly from Position A being slightly to the right. Position C is the farthest to the right. When the core 57 is more to the right than Position C, the motor 22 is made to drive its table rapidly in a direction to carry the core 57 toward Position B. When the core reaches Position C, the motor is driven more slowly until the core reaches Position B. If the core occupies a position to the left of Position A, motor 22 drives its table rapidly to the left until it reaches Position A. When Position A is reached the motor 22 is stopped but the mechanism will coast and be driven to the right past the amount of backlash in the system to point between Positions C and B from whence it will be returned to Position B at a slow rate.

In FIG. 6 a flip-flop output signal corresponding to −1 causes rapid operation of motor 22 to drive its table to the right toward Position C. A flip-flop output signal corresponding to +2 causes slow operation of the motor 22 to drive the table toward the right toward Position B. The flip-flop signal −3 results in fast operation of motor 22 to drive the table rapidly to the left as described above.

Returning now to FIG. 4, the flip-flop 64 provides an output at terminal 1 which is at ground potential for core positions to the right of Position C in FIG. 6 and which is negative for core positions to the left of Position C. The output of flip-flop 63 is a negative pulse at terminal 2 when the core has a position at the left of Position B and which is at ground potential when the core is at the right of this position. The output of flip-flop 62 at terminal 3 is negative when the core 57 occupies a position to the right of Position A and is at ground potential when the core position is to the left of Position A. When the output at terminal 3 is negative, the output at terminal 4 of flip-flop 62 is positive. These several output terminals of the flip-flops in FIG. 4 are connected to correspondingly numbered terminal points in FIG. 5 which depicts that portion of the servo which develops the speed and direction control output signals. These output signals are applied to the switching unit 74 of FIG. 4 which translates pulses received at its right and left input terminals into signals which cause the motor 22 to step right and left.

The circuit of FIG. 5 comprises three sections. At the left is a voltage-to-frequency converter or oscillator which utilizes unijunction transistor 76. Line 77 is more negative than the ground line 78 and the positive line 80 is more positive than the ground line 78. The unijunction oscillator includes a resistor 81 connected from one base to the negative line and a resistor 82 connected from the other base to the ground line. The emitter is connected to the negative line through a capacitor 83 and is connected to the negative line through a resistive network which determines the voltage at the emitter of the unijunction transistor. In the absence of negative signals at either of input terminals 1 or 3, the voltage at the emitter is determined by the position on the tap or potentiometer 84. This voltage and the capacity of capacitor 83 determines unijunction oscillation frequency when the solid-state switch 85 is turned off. However, when either of the input terminals 1 or 3 is rendered negative with respect to ground, that negative signal is applied through diode 86 or through diode 87 to turn on the solid state switch to alter the voltage at the emitter of the unijunction transistor 76. In this embodiment the switch being turned on increases the emitter voltage resulting in operation of the oscillator at higher frequency. The output of the unijunction oscillator is applied by a coupling capacitor 88 to the input resistor 89 of a transistor amplifier which employs a transistor 90 whose output load resistor 91 is connected from its collector to the negative line. The amplified output of transistor 90 is applied to the direction control section of the circuit of FIG. 5. That section comprises two lines. These two lines are energized simultaneously by the output of the amplifier section. The line 92 terminates in a terminal labeled "LEFT". This terminal is connected to the corresponding "LEFT" input terminal of the step switch 74. A pulse applied at this terminal to the step switch drives the stepping motor 22 in a direction to drive the table connected to that motor in a leftward direction. The other output line is identified by the reference numeral 93. It terminates in a terminal labeled "RIGHT" which in turn is connected to the "RIGHT" input terminal of the step switch 74. A pulse appearing at the "RIGHT" terminal is applied to the motor 22 by the step switch 74 to cause the motor to rotate in a direction that will make its table move in a rightward direction.

Lines 92 and 93 are connected together at a junction point 94 at their input ends. A line 96 connects the collector of transistor 90 with that junction point 94 through a series blocking rectifier 97. A resistor 98 is connected between the negative supply line and line 96 at a point intermediate the rectifier 97 and the junction point 94. A tap on resistor 98 is connected to one terminal of a STOP switch whose other terminal is connected to the positive ground line 78. Beginning at junction 94, the line 92 includes, in series, a capacitor 99, a rectifier 100, and the LEFT terminal. Line 93 begins at junction 94 and includes, in series, a capacitor 101, a rectifier 102, and the RIGHT terminal. A control terminal 2 is connected through a series resistor 103 to a point in line 93 intermediate capacitors 101 and rectifier 102. A control terminal 4 is connected through a series resistor 104 to line 92 at a point intermediate the capacitor 99 and rectifier 100. The LEFT and RIGHT terminals are connected to the positive lines 78 through resistors 105 and 106 respectively. The rectifiers 97, 100 and 102 have polarity such that capacitors 99 and 101 are charged to the potential of the negative supply line 77 through resistor 98. They are discharged through rectifier 97 and transistor 90 when the latter is turned on by a pulse from the unijunction transistor 76. When this is done, a pulse will appear at the LEFT and the RIGHT terminals. The discharge of these capacitors, and so the appearance of a pulse at the LEFT and RIGHT terminals, can be prevented by applying a negative potential to lines 92 and 93 at a point intermediate the capacitors and their respectively associated rectifiers. The circuit includes provision for applying such a negative potential to line 92 from the terminal 4 through the series resistor 104. Similarly, a negative potential can be applied to line 93 intermediate its capacitor 101 and rectifier 102 by applying a negative signal to the control terminal 2.

Whether the signals are directed to the "LEFT" or "RIGHT" output signals and whether the pulse rate is low, being determined only by the setting of potentiometer 84, or whether the pulse rate and motor operations are fast, because the switch 85 is actuated, depends upon the application of pulses of proper polarity to the several control points in the manner illustrated in FIG. 6. It will be apparent that this specific control scheme need not be employed but that the control logic could be modified to accomplish the same control result or, if more convenient to the application of the invention, any other control result. Also, it will be apparent that the invention is applicable to three-dimensional positioning by making the probe movable in the third direction, by providing a transducer by which to translate that motion into electrical signals, by providing output elements movable in three directions, and by providing output elements movable in three directions, and by providing an additional control signal conditioner to control third axis positioning in accordance with the third transducer signal. In one example the pivot 34 is mounted so that it will swivel and means are provided for detecting errors in swivel angle. One of the advantages of the invention is that the reference position can be changed simply by altering the length and direction of the end of the sliding arm on which the stylus or probe is carried. In this connection, it will be apparent that the ratio of probe to output member displacement may be easily altered by the use of a pantograph arrangement either connecting the input structure to the output member or connected between the probe and the input arm.

It is not essential that a single-probe structure be employed to introduce all of the input position information into the system. In certain applications it will be advantageous to employ a separate probe for each of the input dimensions whether they be lineal or rotational dimensions. Such a system might be advantageous where it is desired to avoid making a master whose form is an exact image of the work to be produced with the positioner. In a simple example, if it is desired to form holes in a plate it may be entirely adequate to employ one probe to identify the radial line on which holes are to be formed and to employ a second probe for identifying the point along that radial line at which the holes are to be formed. It will be apparent that movement of those probes over an arcuate scale and a lineal scale respectively will be sufficient to provide input information to a positioner without need to form a master template to which to move a single probe.

The positioning structure illustrated in FIGS. 7 and 8 employs a separate probe for each of the dimensions in which positioning is to be accomplished. This is a three-dimension positioner in which the work table is rotatable, is moveable along a line in the plane of the table, and is also movable along a line perpendicular to the plane of the table.

In FIG. 7, the moveable base structure comprises a rotatable output base member 120 carried by a center shaft 122 upon a table 124. The table moves on ways 126 across an undertable 128. The table 120 is rotated by the worm gear 130 which is turned by drive motor 132 and which engages the teeth of a gear not visible in FIG. 7 but whose teeth are formed around the periphery of the lower side of the table 120. Another motor 134 rotates a lead screw 136 to move the table 124 relative to the table 128. The motor 134 is fixed to table 128 and the table 124 carries a travelling nut, not visible, into which the lead screw 136 is threaded.

The reference numeral 140 designates a scale which is carried by the undertable 128. This scale is used in connection with a probe arm carried by the upper table 124. The probe arm 142 is positioned so that its pointer 144 is opposite a selected point on the scale 140. The probe arm is confined to reciprocal movement in a line because it slides in a track formed in the upper table 124. One face of the arm serves as a cam in cooperation with the follower 146 of a pickup device 148 which converts movement of the follower 146 into electrical signals which serve as the input signals for the positioning control portion of the system. The construction of probe arm 142 is not unlike that of the probe arm 32 of the embodiment shown in FIG. 1 except that it has a pointer 144 rather than the stylus 28. The pickup device 148 of FIG. 7 is similar to the pickup device 27 illustrated in FIG. 1 and it is employed in the circuitry of FIG. 4 in the same way.

The system illustrated in FIGS. 7 and 8 includes a means for elevating the base structure. The motive means for elevation is contained within the base structure 150 (see FIG. 8). Elevational position is controlled in the same fashion as is the horizontal position. A moveable probe arm 152 is confined to vertical movement in a slot formed in an attachment 154 to the lower base structure 128. A stylus 156 at the end of that probe arm is positioned on a scale at the end of the scale bar 140. One face of the probe arm is formed as a cam surface for cooperation with a pickup device 158 whose moveable element forms the follower for the cam surface 160 of the probe arm 152. This pickup device is the input element of an electronic control apparatus similar to that depicted in FIGS. 4 and 5.

Rotational input signal information is generated in the pickup device 170 whose moveable element 172 serves as a cam follower for a cam surface 174 formed on the exterior of the circular collar 176 which surrounds the center post 122 of the rotatable table. That collar includes electromagnets by which it can be clutched or unclutched to the table 120. When the electromagnets 180 are deenergized, the collar 176 may be rotated by its probe arm 182 which is moved to the angular position corresponding to the degree in which the table is to be rotated from the reference position which it is shown to occupy in FIG. 7. Because the cam 144 is formed on the exterior surface of the collar 176, rotation of the collar by the probe 182 results in actuation of the moveable element 172 of the pickup 170 to provide input information to the control portion of the system which indicates whether the table is to be moved left or right. The reference position of the cam is a position on its sloping surface which is identified as that portion which is engaged by the moveable element 172 in FIG. 7.

Although I have shown and described certain specific embodiments of my invention, I am fully aware that many modifications thereof are possible. My invention, therefore, is not to be restricted except insofar as is necessitated by the prior art and by the spirit of the appended claims.

I claim:
1. In a servo positioner;
a movable base structure;
a probe carried by said base and movable relative to a point on the base in at least two dimensions at least one of which includes a rotation about a pivotal axis extending through the point;
sensing means for sensing differences, in said two dimensions, in the relative position of the probe and point from a reference relative position; and
positioning means responsive to said sensing means for positioning said base structure such that the point occupies said reference relative position;
in which said positioning means comprises a pair of stepping motors connected to said movable base and each effective, when energized, to alter the position of the base in a direction normal to the direction of action of the other; said sensing means comprising a pair of sensors each effective to provide electrical signals indicative of displacement of said probe in a respectively associated one of said dimensions and of the direction of such displacement, and each sensor including means responsive to displacement and direction of displacement to actuate an associated one of said stepping motors in a direction tending to return said base to overcome such displacement; and
in which said stepping motors are responsive to rotate in a direction corresponding to the polarity of applied electrical pulses at a speed corresponding to their frequency; and in which each sensor includes means for generating at least three electrical pulses the polarity of a first pulse of which is reversed as said displacement is changed from one direction to the other, and a second pulse of which is reversed as said displacement in said other direction is altered to exceed a selected displacement, and the third pulse of which is reversed as said displacement in the other direction is altered to exceed a selected greater displacement; and means for applying said pulses to a respectively associated one of said stepping motors after altering the frequency of pulses applied to said motor when the polarity of one of said first pulse and said third pulse is reversed.

2. In a servosystem:

error detection means sensitive to the state of a condition relative to a reference state for providing a first signal indicative of whether the state of the condition exceeds and whether it does not exceed the reference state, for providing a second signal indicative of whether the state of the condition differs and whether it does not differ from the reference state by more than a selected amount, and for providing a third signal indicative of whether the state of the condition differs and whether it does not differ from the reference state by more than a selected greater amount;

correction means responsive to said signals for altering the state of said condition in a direction toward said reference condition and at a rate greater in response to certain of said signals than in response to others of them;

in which said first, second and third signals comprise pulses of one phase when the state of said condition exceeds, differs by more than said selected amount, and differs by more than said selected greater amount, respectively, and otherwise of opposite phase; said correction means comprising a stepping motor responsive to said signals to rotate in a direction determined by the phase of said signals and at a speed determined by their frequency;

said error detection means comprising three alternating current bridges adjustable in accordance with the state of said condition and each experiencing phase reversal of its output at null.

3. The invention defined in claim 2, said correction means further comprising a pulse generator whose frequency is variable according to the phase of said signals, and means connecting the output of said pulse generator to said stepping motor in a direction to determine motor rotation direction in accordance with the phase of said signals.

4. A servo positioner comprising:

a probe mounted on a base movable relative to a reference position which is fixed relative to the base;

sensing means for sensing the fact of separation of the probe from the reference position and the direction of that separation and for providing a signal indicative of separation and the direction thereof;

base positioning means sensitive to said signal for moving the base relative to the probe until the probe has the reference position;

the base positioning means comprising a fixed frequency energy source, a stepping motor and means for connecting the source to the motor while the probe has other than reference position, the probe being freely movable relative to the reference position to a degree of separation and at a velocity independent of the frequency of said course;

means for driving the stepping motor at at least two different fixed speeds; and means for sensing separation of probe and reference point greater than a predetermined separation and for driving said stepping motor at one speed when separation is greater than said predetermined separation and at another speed when less than said predetermined separation;

said sensing means and said means for sensing separation of probe and reference point greater than a predetermined separation both comprising bridge circuits having null points at different degrees of separation between probe and reference point.